United States Patent
Daoud

(10) Patent No.: US 6,453,107 B1
(45) Date of Patent: Sep. 17, 2002

(54) TRAY LOCKING FEATURE FOR A FIBER ENCLOSURE

(75) Inventor: Bassel Hage Daoud, Parsippany, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/387,572

(22) Filed: Aug. 31, 1999

(51) Int. Cl.$^7$ ................................................. G02B 6/00
(52) U.S. Cl. ....................................... 385/135; 385/137
(58) Field of Search ................................. 385/134, 135, 385/136, 137

(56) References Cited

U.S. PATENT DOCUMENTS

| | | | |
|---|---|---|---|
| 4,913,522 A | 4/1990 | Nolf et al. .................. | 350/96.2 |
| 5,071,220 A | 12/1991 | Ruello et al. ................ | 385/135 |
| 5,155,794 A | 10/1992 | Nolf et al. ................... | 385/135 |
| 5,249,253 A | 9/1993 | Franckx et al. .............. | 385/135 |
| 5,323,480 A * | 6/1994 | Mullaney et al. | |
| 5,602,954 A | 2/1997 | Nolf et al. ................... | 385/135 |
| 5,619,608 A | 4/1997 | Foss et al. ................... | 385/135 |
| 6,249,632 B1 * | 6/2001 | Wittmeier, II et al. | |
| 6,253,016 B1 | 6/2001 | Daoud | |
| 6,275,640 B1 * | 8/2001 | Hunsinger et al. | |
| 6,275,641 B1 | 8/2001 | Daoud | |

* cited by examiner

Primary Examiner—Frank G. Font
Assistant Examiner—Michael P Mooney
(74) Attorney, Agent, or Firm—Duane, Morris & Heckscher, LLP

(57) ABSTRACT

An optical fiber organizer includes a plurality of optical fiber trays. Each tray has a top side for holding a fiber. Each tray has a hinge portion. The tray carrier has a plurality of sockets. Each socket is capable of receiving the hinge portion of a respective tray. Each tray has a first position on the tray carrier. The trays are stacked parallel to each other when the trays are in the first position. Each socket has an associated first detent, including a first boss below the socket, for maintaining its respective tray in the first position. Each socket has a second-position detent, including a second boss above the socket, for maintaining its respective tray in a second position about 90 degrees from the first position. The top side of one of the trays is exposed when at least one of the trays is in the second position. The hinge portion of the tray has a hole capable of receiving either the first boss or the second boss. The hinge portion of the tray has a pair of ramps adjacent the hole, for guiding either the first or second boss of the tray carrier to the hole. The tray carrier includes: a first stop for preventing the tray from rotating beyond the first position, and a second stop for preventing the tray from rotating beyond the second position.

22 Claims, 10 Drawing Sheets

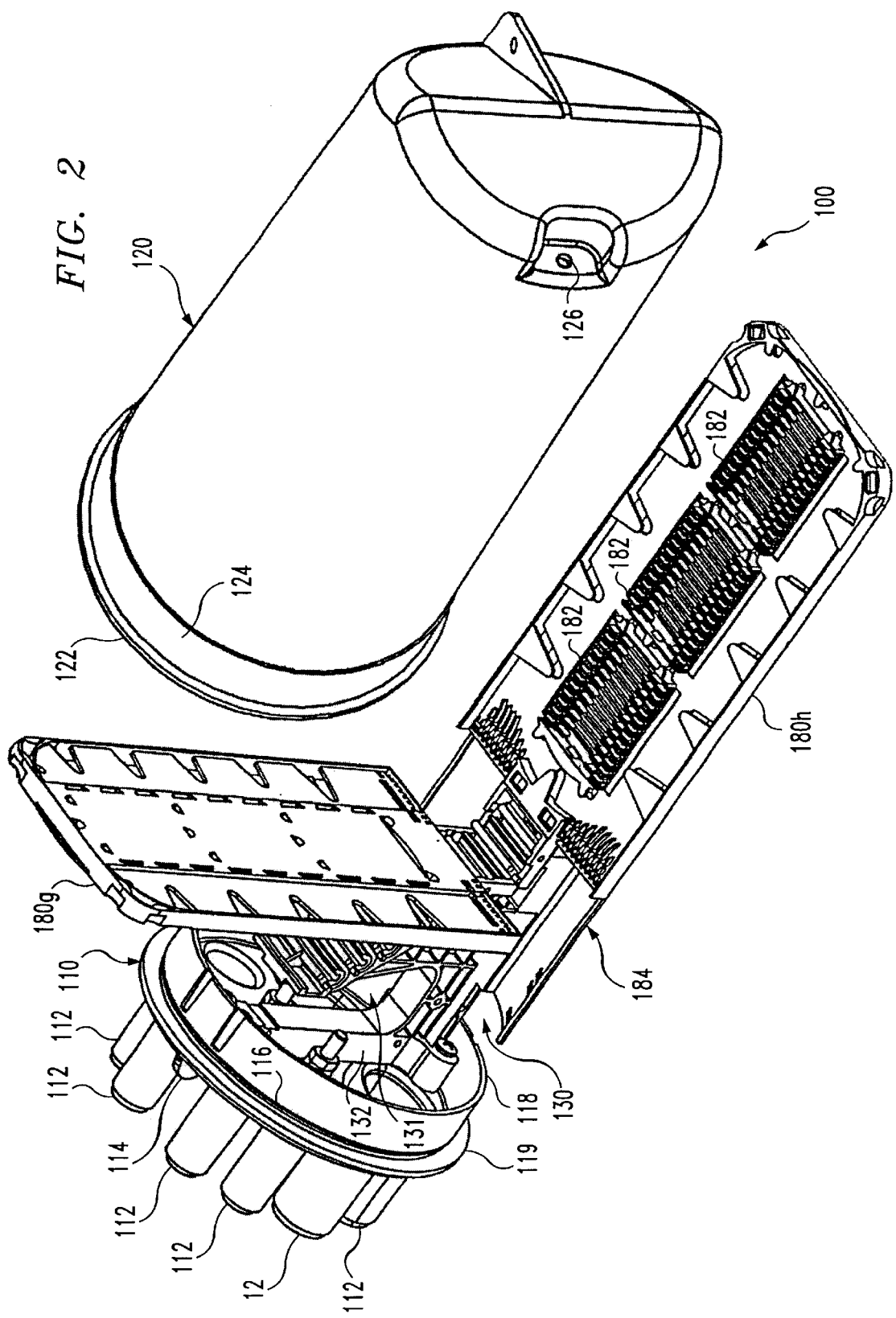

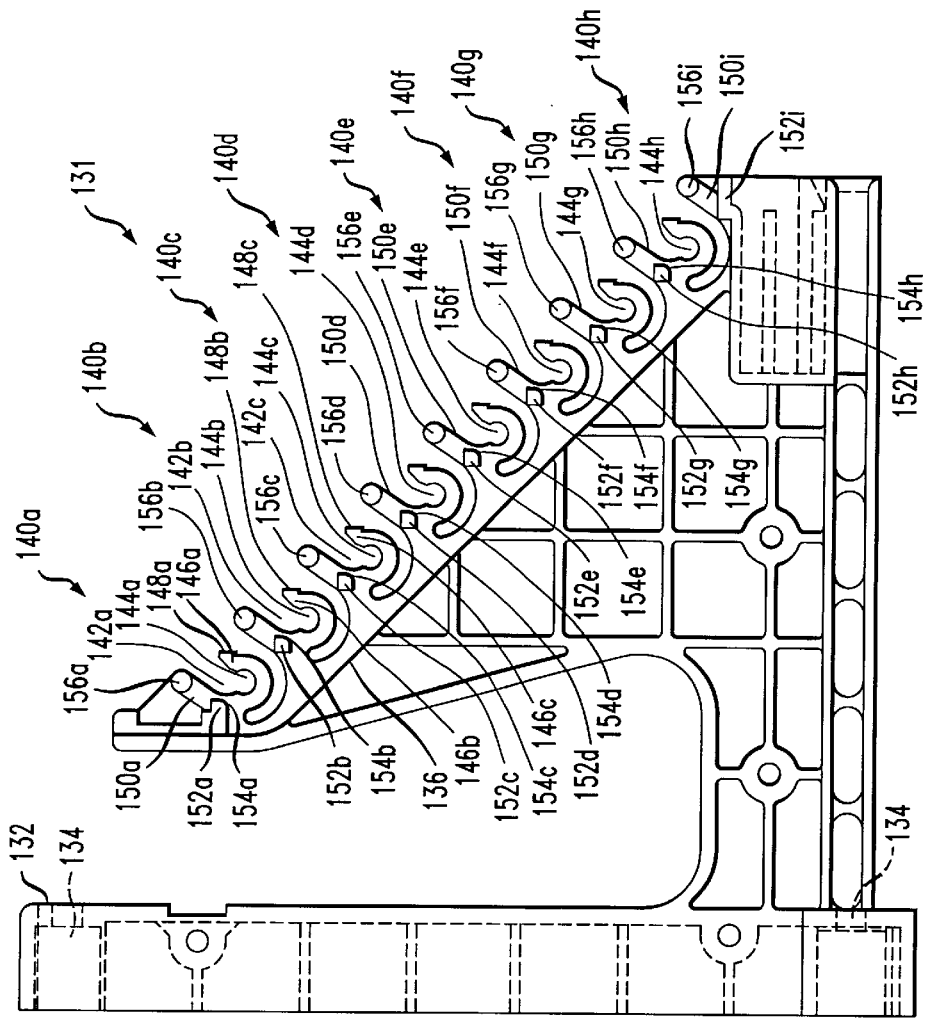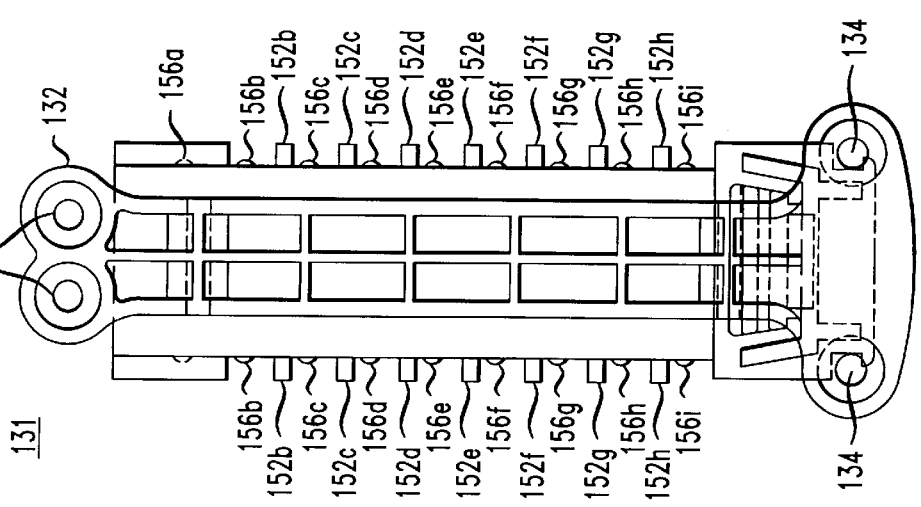

TRAY LOCKING FEATURE FOR A FIBER ENCLOSURE

FIELD OF THE INVENTION

The present invention relates to telecommunications equipment generally, and more specifically to enclosures for optical fibers.

DESCRIPTION OF THE RELATED ART

Optical fiber communication networks have gained wide acceptance in place of the use of electrical cable systems, due to the significantly enhanced bandwidth capabilities of optical fiber and its immunity to electromagnetic and radiomagnetic interference. Very significant advantages are achievable by the use of optical fiber rather than electrical conduction media. Nevertheless, a continuing problem with the deployment of optical fiber systems is providing a method to terminate optical fiber cables so as to make electrical or optical connections to fibers within the cables while providing adequate environmental protection and allowing for easy installation.

U.S. Pat. No. 5,069,516 to Kohy et al. and U.S. Pat. No. 5,396,575 to Hayward et al. are expressly incorporated by reference herein in their entireties for their teachings on sealed fiber enclosures.

U.S. Pat. Nos. 4,913,522, 5,155,794 and 5,602,954 to Nolf et al., and U.S. Pat. No. 5,249,253 to Franckx et al. are expressly incorporated by reference herein in their entireties. These patents describe an enclosure for a butt splice of optical fiber cables.

FIG. 1 of the present application shows FIG. 10b of the above-identified Nolf patents. The enclosure includes a base plate 1 and a dome-shaped cover (not shown), which together form a hollow article for use as a butt splice case for optical fibre cables 13. Outlets (not shown) are provided in the base 1 through which the cables 13 pass.

The hollow article contains an optical fibre organizer 30 which comprises a series of trays 5. Each tray includes means 6 for accommodating splice tubes (not shown) which house fibre splices (not shown). The trays 5 are held in an orderly fashion on a carrier 7 which is fixed to the base 1. The trays are hinged along their short edges. The hinging allows chosen trays to be exposed for installation or the repair of the splice, etc.

An apparatus 28 is used for carrying out a combined splicing and sealing operation. The apparatus in conjunction with a splicing machine 29 and the tray organizer assembly are shown in FIG. 1. The apparatus 28 includes: a frame having means 31 for holding the splicing device 29; a releasable clamp 32 for holding the butt splice case or a base 1 thereof; and apparatus 33 for selectively exposing respective trays 5. A cutter 34 is provided to make a clean, properly angled, end to the fibers before splicing. The apparatus 33 is hinged so that the top bar can move as indicated by the arrow in FIG. 1, thus allowing selected trays to be held in the upright position.

The above described apparatus 33 is bulky and cumbersome to use. Other, more convenient methods have been sought to allow one of the splice trays 5 to be selectively exposed for installation or repair of a splice. In one example, a clip (not shown) has been inserted in the hinged corner between the exposed horizontal tray and the adjacent (unexposed) vertical tray immediately above the exposed tray. The clip prevents the adjacent vertical tray from pivoting downward about its hinge, maintaining the horizontal tray exposed. Although the clip is compact, it is easily lost. Further, if the worker forgets to remove the clip when the work is completed, either the clip or the trays, or both, may be damaged when the vertical trays are lowered.

An improved tray organizer system is desired.

SUMMARY OF THE INVENTION

The present invention is an optical fiber organizer including at least one optical fiber tray having a top side for holding a fiber. The tray has a hinge portion. A tray carrier has at least one socket. The socket is capable of receiving the hinge portion of the tray. The tray has a first position on the tray carrier that is suitable for storing the tray within an optical fiber enclosure. The tray carrier has a second-position detent for maintaining the tray in a second position, where the first and second positions differ from each other.

Another aspect of the invention is a method for providing access to an optical fiber tray. A tray carrier is provided having a plurality of fiber optic trays pivotally attached thereto. The trays are stackable on top of each other and parallel to each other. A first one of the trays is selected to be accessed. A second one of the trays that is adjacent to and above the first fiber optic tray is rotated to a detent position, wherein the second tray remains in the detent position without attaching any additional retaining device to the second tray.

BRIEF DESCRIPTION OF THE DRAWINGS

FIG. 2 is an isometric view of a first exemplary fiber enclosure including a fiber tray organizer system according to the present invention.

FIG. 3 is a rear elevation view of the tray carrier shown in FIG. 2.

FIG. 4 is a side elevation view of the tray carrier shown in FIG. 3.

DETAILED DESCRIPTION

Figure 1:
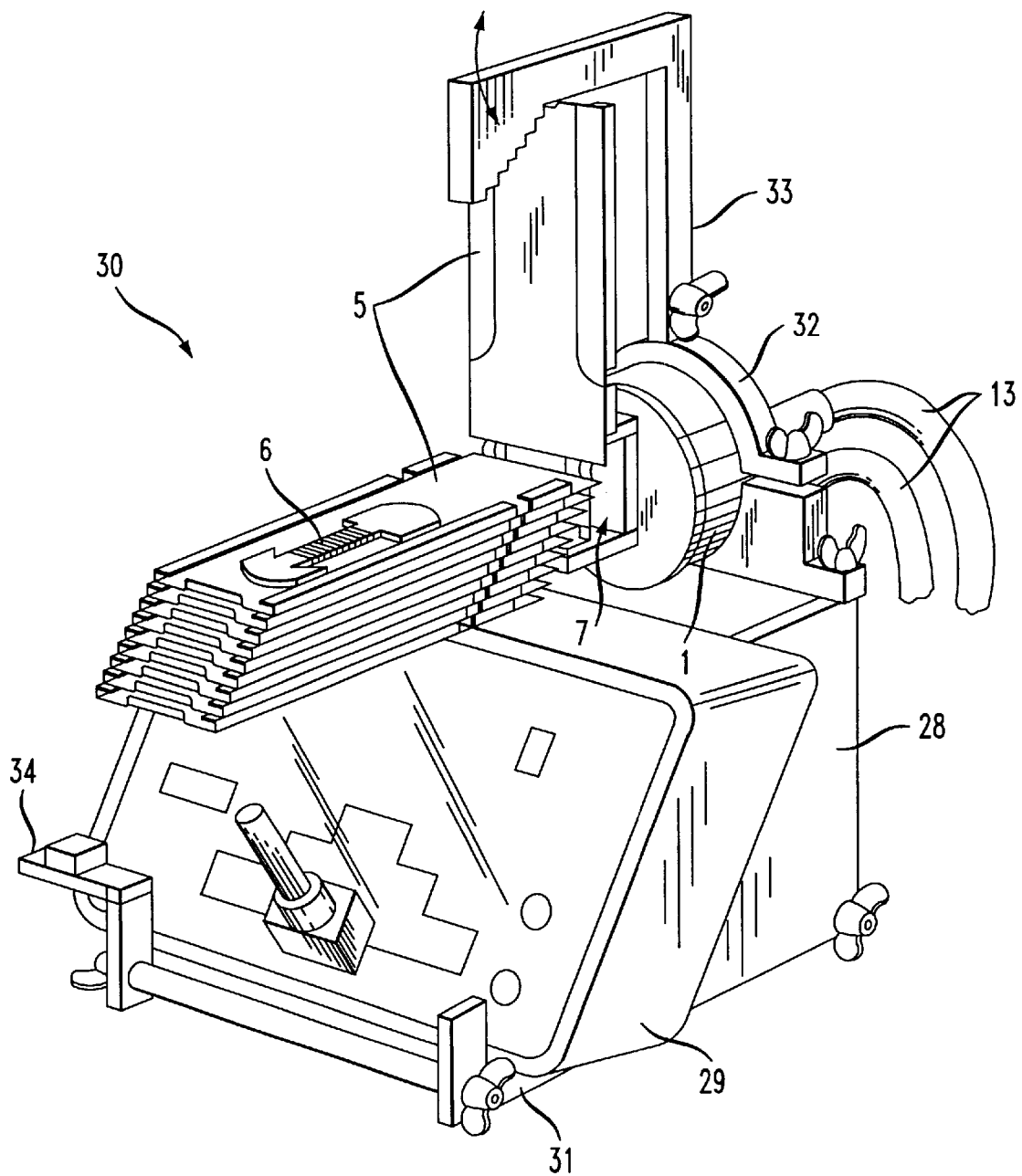
FIG. 1 is an isometric view of a conventional fiber tray organizer system.

FIG. 2 shows a first exemplary fiber enclosure assembly 100 according to the present invention. The enclosure assembly 100 includes a base plate 110 and a generally dome shaped cover 120 (also referred to herein as the enclosure). Enclosure assembly 100 is suitable for deployment in environments requiring an air-tight, water-tight seal, and may be pressurized. The assembly 100 may be buried in the ground, or may be deployed underwater or on a pole. The assembly 100 is sealed by a seal 116, which may be a conventional o-ring. The seal 116 is placed on a cylindrical collar 118 that fits inside the rim 124 of the cover 120.

The base plate 110 has an annular mating surface 119 that abuts a corresponding mating surface 122 of the cover 120 when the base plate 110 is inserted into the cover. Once the two mating surfaces 119 and 122 are placed against each other, a clamp, which may be a conventional V-clamp (not shown) is placed over both mating surfaces to secure the cover 120 on the base plate 110. U.S. Pat. No. 5,315,489 to McCall et al. is expressly incorporated by reference herein for its teachings on a clamp suitable for use on fiber enclosures. A clamp as described by McCall et al. may be used to clamp the enclosure assembly 100. A valve (not shown) is inserted in a valve port 126. Pressurized air can be introduced into the enclosure assembly 100 through the valve.

The base plate 110 has a plurality of cable ports 112 (also referred to as cable receptacle tubes) on its exterior surface. The cable ports 112 provide a means of attachment for cables (not shown) which contain optical fibers (not shown). The cable ports 112 may have a variety of sizes for accommodating differently sized cables. To secure a cable using one of the cable ports 112, the distal end of the cable port is removed, using a blade, which may be a saw or a knife. A length of the sheathing is stripped from the end of the cable, exposing fibers. A sleeve of heat shrink tubing (not shown) is placed over the cable port 112, and the cable/fibers are inserted through the sleeve and the cable port. The heat shrink tubing is heated to shrink the tubing and secure the cable to the cable port. A mounting flange 114 may be used to attach the base plate 110 to a pole.

The base plate 110 has a fiber tray organizer 130 attached to its interior surface. The tray organizer 130 includes a tray carrier 131 and a plurality of fiber trays 180a–180h (Only trays 180g and 180h shown in FIG. 2). The tray carrier 131 has a mounting plate 132 with mounting holes 134, which may be used attach the mounting plate 132 to the base plate 110 using fasteners 135. A diagonal bracket 136 is attached to the mounting plate 132. Bracket 136 lies on a diagonal with respect to the base plate 110, and with respect to the positions of the trays 180a–180h mounted on the bracket 136. The trays 180a–180h have a plurality of attachment sections 183 (shown in FIG. 8) into which optical fiber splices 182, connectors (not shown) or standard end fiber terminations (not shown) can be retained. A compartment is formed between a slack cable tray 184 (shown in FIG. 9) and the bottom fiber tray 180h for storing slack fiber. Optical fiber which is not being coupled within the enclosure 100 can also be stored within the compartment.

Figure 5:
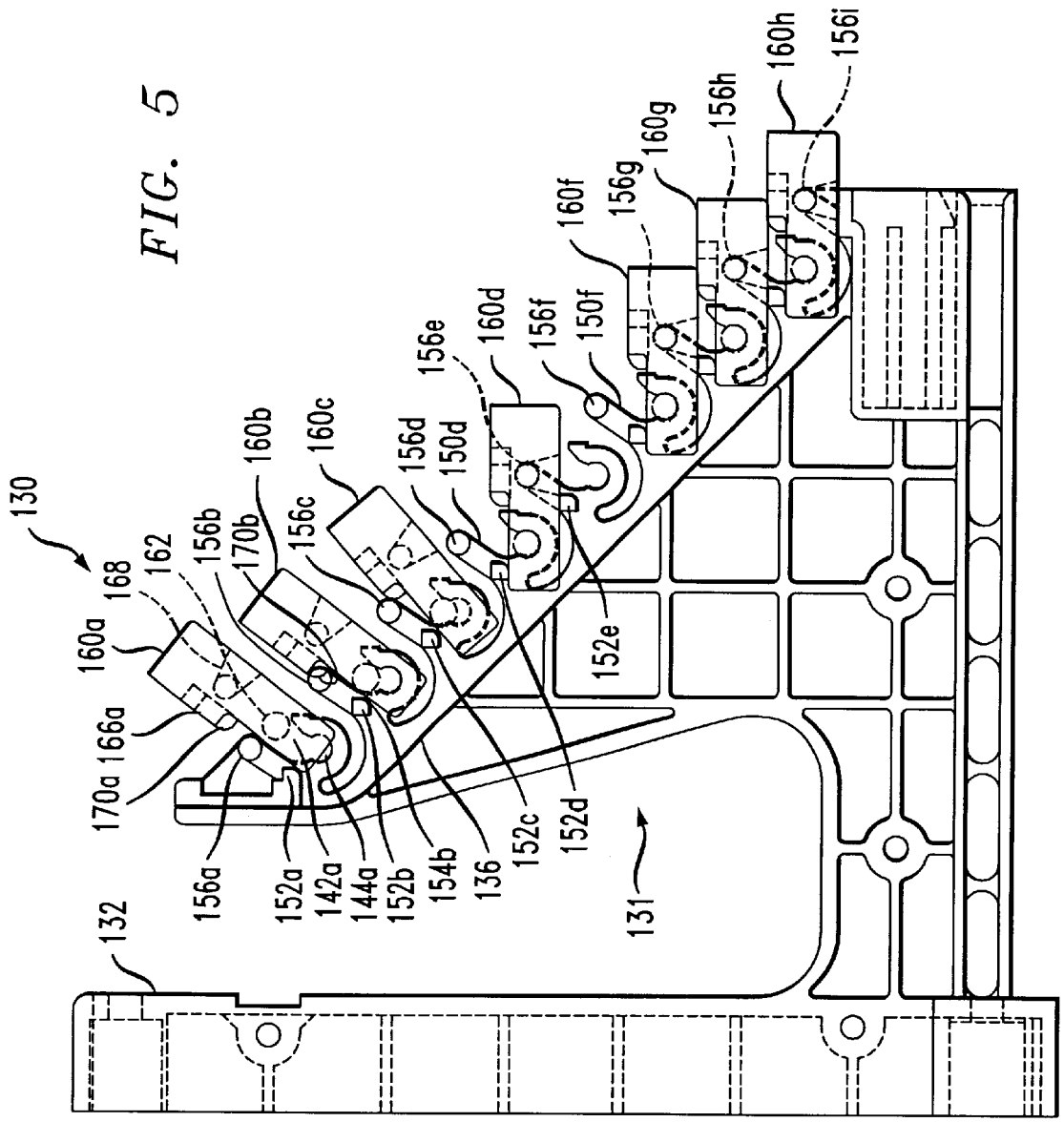
FIG. 5 is a side elevation view of the tray carrier of FIG. 4, showing the insertion of tray hinges on the carrier. The hinges are shown, but the remainder of the trays 180a–180h are omitted from FIG. 5, solely to simplify
Figure 6:
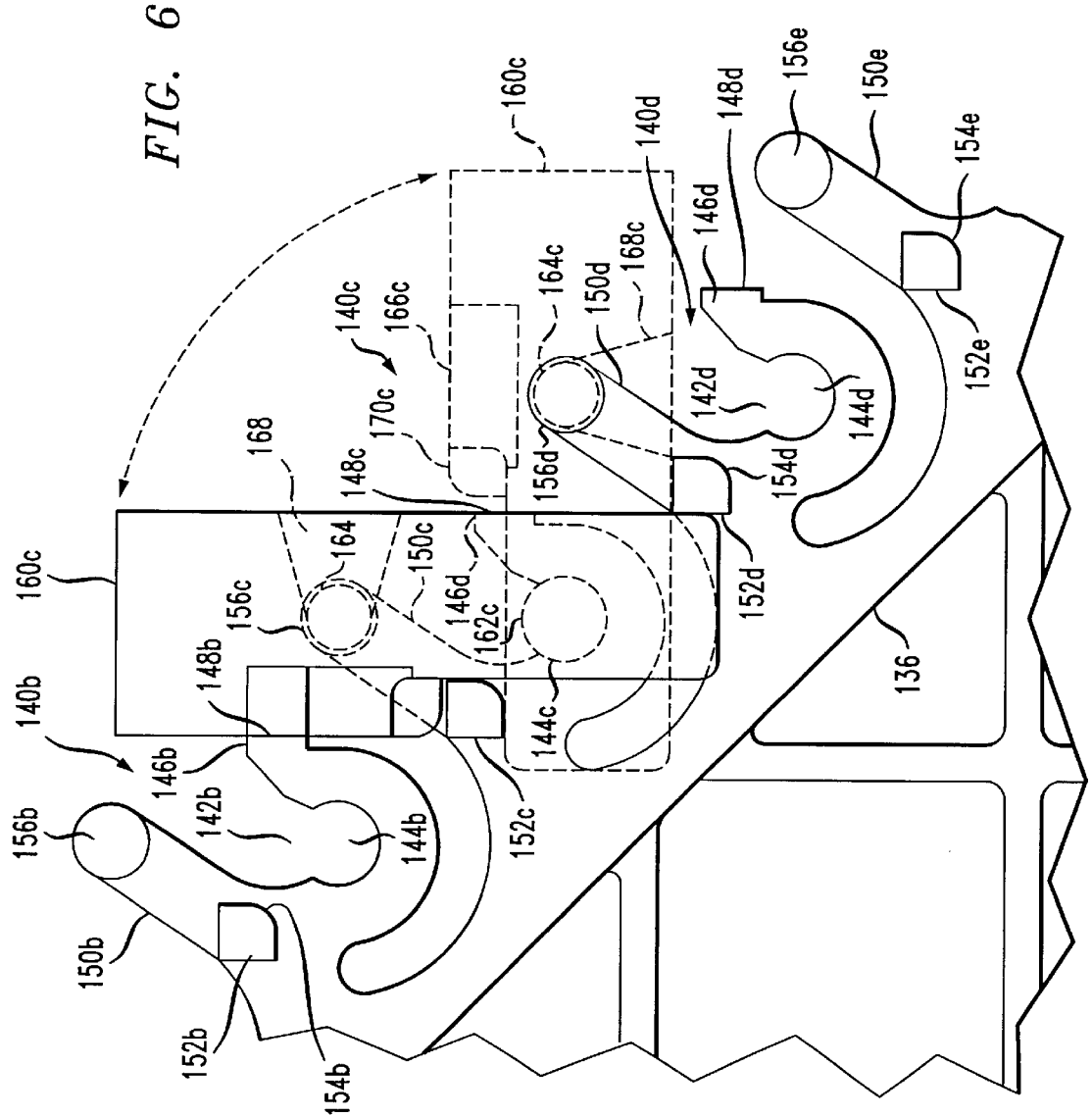
FIG. 6 is a detail of a portion of the tray carrier of FIG. 5, showing the two alternate positions of the tray hinge.
Figure 7:
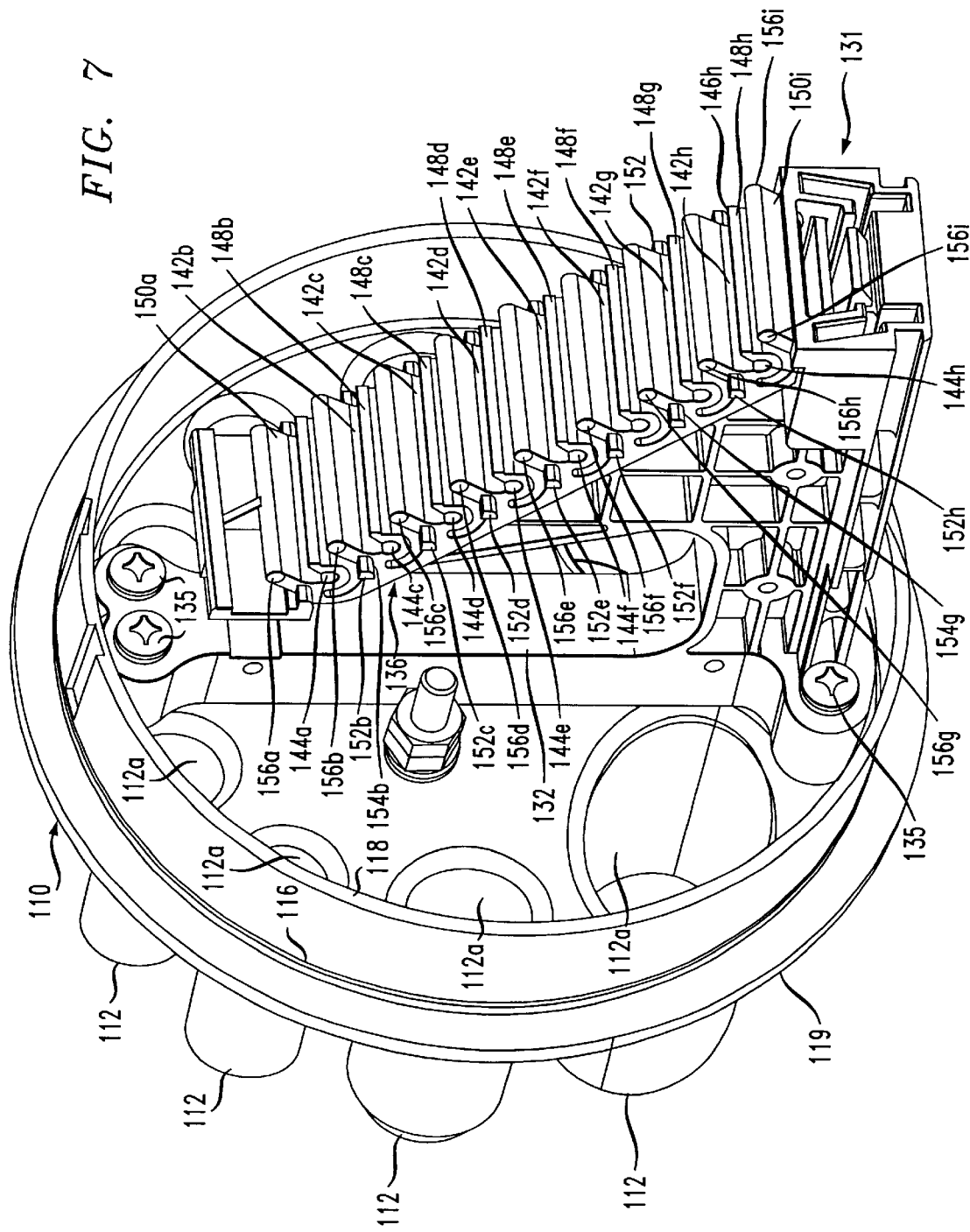
FIG. 7 is an isometric view of a the base plate and tray carrier of FIG. 2.

FIGS. 3–7 show the exemplary tray carrier 131. FIGS. 3 and 4 show the tray carrier 131 of the fiber organizer 130 standing alone. FIG. 5 shows the tray carrier 131 with the hinge portions 160a–160h of the trays 180a–180h inserted in the sockets 140a–140h. FIG. 6 shows an enlarged detail of the tray carrier 131 with tray 180c installed. FIG. 7 shows the tray carrier 131 mounted on the base plate 110.

Referring again to FIG. 4, the tray carrier 131 includes a bracket 136 that includes a plurality of sockets 140a–140h. The bracket 136 is diagonal to a plane in which the trays 180a–180h lie when the trays are in the first (horizontal in FIG. 2) position. A plurality of extension members 150a–150i are attached to bracket 136. The members 150a–150i are approximately perpendicular to the bracket 136. Each member 150a–150i has a pair of bosses, 156a–156i, respectively on both sides of the extension member. The sockets 140a–140h and bosses 156a–156i alternate with each other on the tray carrier 131.

According to an aspect of the invention, each fiber tray 180a–180h can be placed in one of two detent positions, which are shown as horizontal and vertical positions in FIG. 2. Tray 180h is in the first (horizontal) detent position, and tray 180g is in the second (vertical) detent position. Once placed in either detent position, the tray remains in that position until a force is applied to move the tray. The detents allow the trays to be placed in the desired position without using an external fixture (as shown in FIG. 1), and without inserting an external stop, clamp or clip onto the assembly. By providing the two detent positions, the tray organizer 130 allows any tray to be moved between the first and second positions simply by applying a predetermined force to the tray. It is unnecessary for any external mechanism to be applied.

Reference is now made to FIGS. 4–6. In the exemplary embodiment, for each individual socket 140a–140h, the first-position detent includes a first boss 156b–156i, respectively, below the sleeve 144a–144h, respectively. Each socket 140a–140h has a respective second-position detent that includes a second boss 156a–156h respectively, above the sleeve 144a–144h of the socket 140a–140h. For example, as shown in FIG. 6, socket 140c has a first position detent including a first boss 156d below sleeve 144c and a second-position detent including boss 156c above sleeve 144c of socket 140c. The tray carrier 131 has a plurality of members 150a–150h on which respective bosses 156a–156h are located. Each diagonal member 150a–150h has one of the plurality of sockets 140a–140h depending therefrom. The boss 156a–156h on the member 150a–150h from which a socket 140a–140h depends forms the second-position detent associated with that socket. Sleeves 144a–144h are formed within hooks 146a–146h depending from respective members 150a–150h.

For each socket 140a–140h, the tray carrier 131 includes a first stop 152b–152i respectively, below the sleeve 144a–144h. For example, socket 140a has a corresponding first stop 152b, below sleeve 144a. The first stops 152b–152i (below the sockets) prevent the trays 180 from rotating clockwise beyond the first position (horizontal in FIG. 2). Each socket 140a–140h has a respective second stop 152a–152h above the sleeve 144a–144h. For example, socket 140a has a corresponding second stop 152a, above sleeve 144a. The second stops 152a–152h prevent the trays 180 from rotating beyond the second position (vertical in FIG. 2).

The optical fiber organizer 130 includes a plurality of optical fiber trays 180a–180h. Each tray 180a–180h has a top side for holding one or more fibers (not shown). Each tray 180a–180h has a hinge portion 160a–160h, respectively. Sockets 140a–140h are capable of receiving the respective hinge portions 160a–160h of respective trays 180a–180h. Each tray 180a–180h has a first position on the tray carrier 131 (the horizontal position in FIG. 2). The trays 180a–180h are stacked parallel to each other when the trays are in the first position. The first position is suitable for storing the trays 180a–180h within the optical fiber enclosure 120. Sockets 140a–140h have associated first-position detents 156b–156i, respectively, for maintaining respective trays 180a–180h in the first position. Sockets 140a–140h have associated second-position detents 156a–156h, respectively, for maintaining respective trays 180a–180h in the second position (the vertical position in FIG. 2). For example, socket 140a has a first-position detent 156b and a second-position detent 156a. The top side of one of the trays 180a–180h is exposed when at least one of the trays is in the second position. For example, in FIG. 2, the top side of tray 180h is exposed.

In the exemplary embodiment, the first and second positions differ from each other in angle by about 90 degrees. Thus, when the fiber organizer 130 is horizontal, the trays in the second position are vertical. This vertical position is both a stable position, and a position providing easy access to the exposed fiber tray, and is thus preferred. Other angles may be used. For example, the trays in the second position may be in any position that is at least about 45 degrees or more from the first position.

Figure 8:
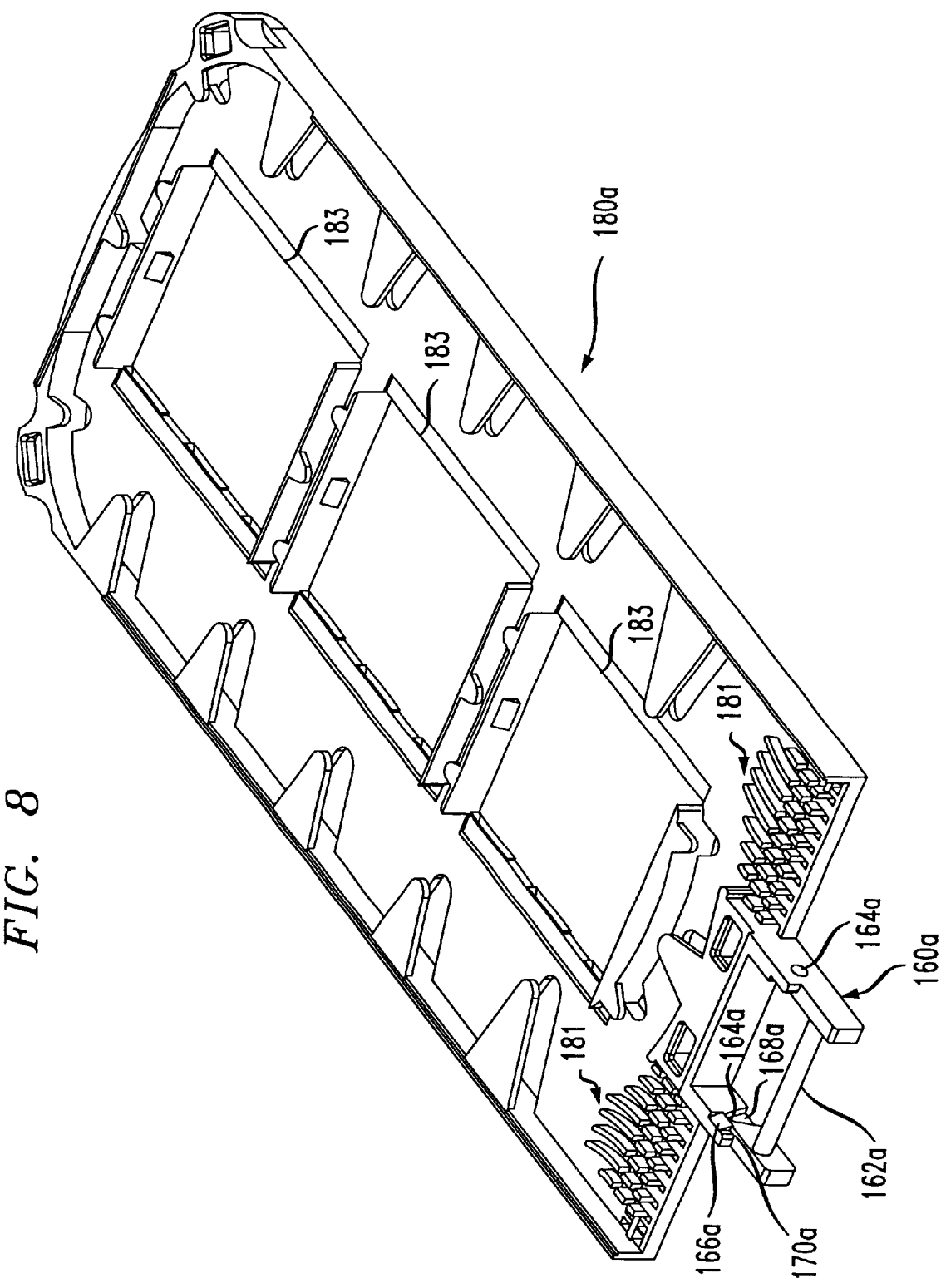
FIG. 8 is an isometric view of one of the splice trays shown in FIG. 2.
Figure 9:
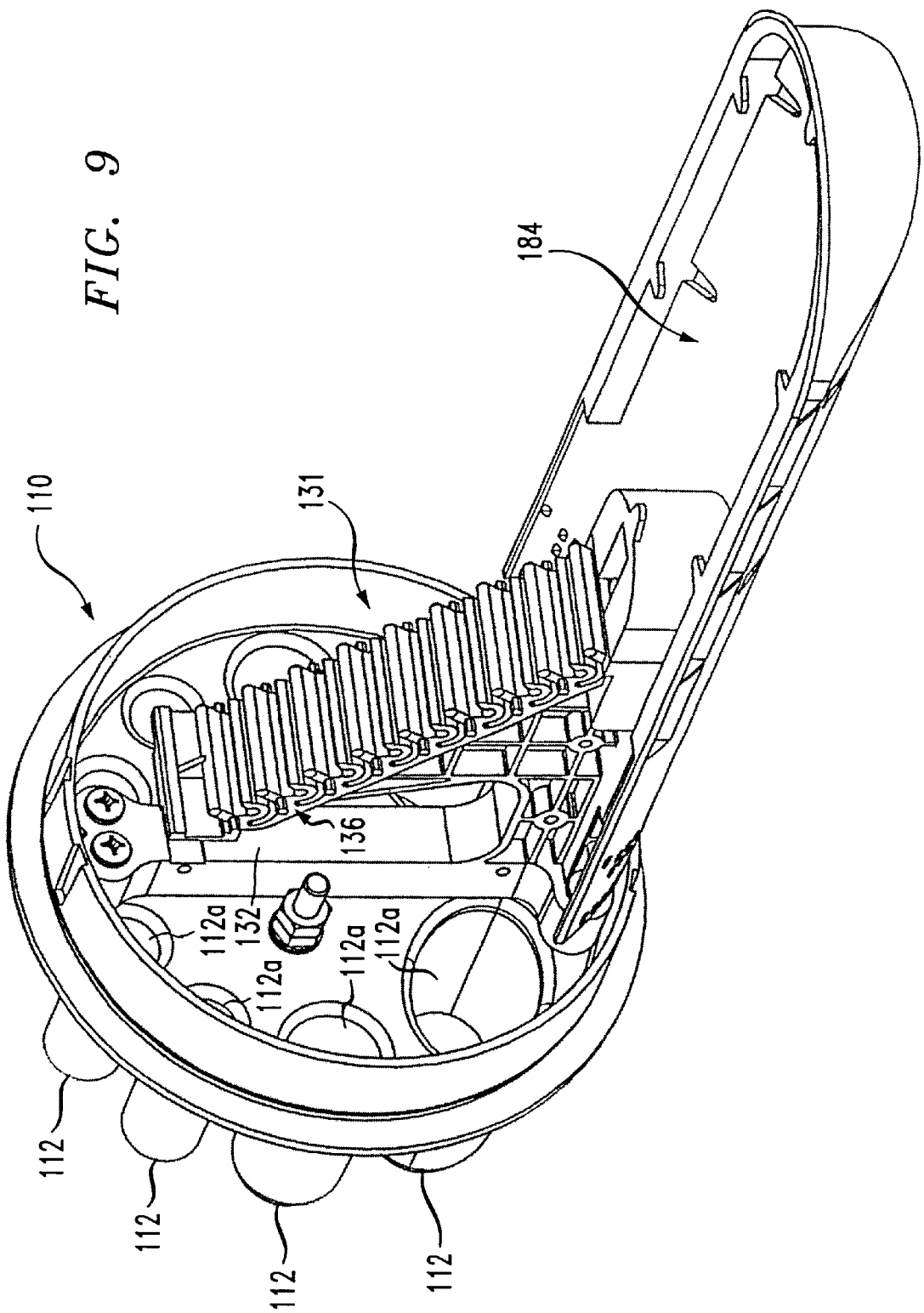
FIG. 9 is an isometric view of the base plate and tray carrier of FIG. 2, with a slack cable tray attached beneath the locations of the splice trays (not shown).

FIG. 8 shows an exemplary tray 180a. Trays 180b–180h may be similar to tray 180a. The hinge portions 160a–160h of respective trays 180a–180h pivot within sleeves 144a–144h. Hinge portions 160a–160h have respective holes 164a–164h capable of receiving either the first boss 156b–156i, below respective sleeves 144a–144h, or the second boss 156a–156h above respective sleeves 144a–144h. For example, as shown in FIG. 6, the hinge portion 160c of tray 180c (in socket 140c) has a hole 164c capable of receiving either the first boss 156d below socket 140c or the second boss 156c above socket 140c.

The hinge portions 160a–160h of respective trays 180a–180h each have a pair of ramps 166a–166h and 168a–168h, respectively. The ramps 166a–166h and 168a–168h are adjacent respective holes 164a–164h. Ramps 166a–166h guide the respective second bosses 156a–156h of the tray carrier 131 to respective holes 164a–164h. Ramps 168a–168h guide the first bosses 156a–156i of the tray carrier 131 to respective holes 164a–164h. For example, as shown in FIG. 6, hinge portion 160c of tray 180c has a ramp 166c for guiding the second boss 156c into hole 164c, and a ramp 168c for guiding the first boss 156d into hole 164c.

As best seen in FIG. 6, the diameter of the bosses 156a–156i is larger than the diameter of the holes 164a–164h which the bosses engage. While one of the bosses 156a–156i is inside its respective hole 164a–164h, a tilted edge of the boss rests on the edge of the hole. Consequently, when a force is applied to rotate the tray, the tilted edge guides the boss out of the hole, without shearing the boss off. The respective sizes of the bosses 156a–156i and the holes 164a–164h may be designed to adjust the amount of force required to move the tray 180a–180h out of their detent positions. In the exemplary embodiment, the bosses 156a–156i and holes 164a–164h are sized so that a moment of about 10–14 inch-lbs. is required to move the tray away from its detent position.

According to another aspect of the exemplary embodiment, as best seen in FIG. 5, a single boss 156b–156g acts as the first-position detent associated with (and positioned below) a first one of the sockets 140a–140g and as the second-position detent associated with (and positioned above) a second one of the sockets 140b–140h, the second socket being adjacent the first socket. For example, boss 156b acts as the first-position (lower) detent for socket 140a and as the second-position (upper) detent for socket 140b. Similarly, boss 156c acts as the first-position detent for socket 140b and as the second-position detent for socket 140c.

Although the exemplary detents include bosses 156a–156i on the tray carrier 131 and holes 164a–164h on the trays 180a–180h, respectively, the positions may be reversed. That is, the detents may include holes on the tray carrier 131 and bosses on the hinge portions of the trays. Further, other types of detent mechanisms may be used.

The tray carrier 131 includes a plurality of stops. Each socket 140a–140h has a first stop 152b–152i for preventing the respective tray 180a–180h received by that socket from rotating beyond the first (horizontal) position. Each socket 140a–140h has a second stop 152a–152h for preventing the respective tray 180a–180h received by that socket from rotating beyond the second (vertical) position. For example, as shown in FIG. 6, socket 140c has a first stop 152d for preventing the tray 180c (including hinge portion 160c) from rotating beyond the first position (shown in phantom), and a second stop 152c for preventing the tray 180c from rotating beyond the second (vertical) position, shown in solid lines.

In the exemplary embodiment, the stops are protrusions 152a–152i. Stops 152a–152i are located at the proximal end of respective extension members 150a–150i. Stops 152a–152h have rounded corners 154a–154h, respectively. Each socket 140a–140h is positioned between two of the stops 152a–152h, so that the stops 152a–152i and sockets 140a–140h alternate with each other.

According to another aspect of the exemplary embodiment, protrusions 152b–152h act as the first stops associated with respective sockets 140a–140g, and as the second stops associated with respective adjacent sockets 140b–140h. For example, protrusion 152b acts as the first stop for socket 140a (preventing tray 180a from moving clockwise past the horizontal position), and as the second stop for socket 140b (preventing tray 180b from moving counter-clockwise past the vertical position).

In the exemplary embodiment, each sleeve 144a–144h is included in a hook-shaped body 146a–146h of the socket 140a–140h and has a substantially vertical surface 148a–148h at an end thereof. The vertical surfaces 148a–148g of respective sockets 140a–140g act as additional second-position stops to limit rotation of respective trays 180b–180h that have respective pivotpins 160b–160h inserted in sockets 140b–140h. For example, vertical surface 148a of socket 140a acts as an additional second-position stop to limit counter-clockwise rotation of tray 180b (which has pivot pin 160b in socket 140b, which is adjacent to the socket 140a).

The tray carrier 131 and trays 180a–180h may be formed from a variety of materials, such as polycarbonate, polyvinyl chloride, ABS or other flexible polymers.

In the exemplary embodiment, each socket 140a–140h has a respective substantially cylindrical sleeve portion 144a–144h, a respective entrance portion 142a–142h connected to the sleeve portion, and a constriction therebetween. The constriction is smaller than a diameter of the sleeve portion 144a–144h, and is smaller than the diameter of the pivot pins 162a–162h of the trays 180a–180h. A benefit of this construction is that, once inserted in the sleeves 144a–144h, the trays 180a–180h cannot easily work loose. However, force is required to insert the pivot pin 162a–162h past the constriction into the sleeve 144a–144h of the socket 140a–140h.

Another aspect of the exemplary embodiment is a structure that facilitates the insertion of trays 180a–180h into the sockets 140a–140h, respectively, while providing a snug fit to eliminate tray wobbling.

FIG. 5 shows the structure and method for inserting trays 180a–180h in the tray carrier 131. Trays 180a–180h have pivot pins 162a–162h, respectively. Each socket 140a–140h is capable of having the pivot pin 162a–162h of a respective tray 180a–180h inserted therein and allowing the respective tray to rotate therein. The respective second protrusion 152a–152h proximate to and above each socket 140a–140h is positioned so that the respective tray 180a–180h being inserted in the socket 140a–140h acts as a class 2 lever. (A class 2 lever has the fulcrum on one end, the force on the opposite end, and the load in the center.) The respective protrusions 152a–152h act as the fulcrums of the respective levers, to forcibly insert the pivot pins 162a–162h of the trays 180a–180h into their respective sockets 140a–140h by applying a force on the trays. Each of the protrusions 152a–152h has a rounded corner 154a–154h, where the hinge portion 160a–160h that includes the pivot pin 162a–162h contacts the protrusion.

For example, the socket 140a is capable of having the pivot pin 162a of tray 180a inserted therein and allowing the tray 180a to rotate therein. Protrusion 152a is proximate to and above the socket 140a. The protrusion 152a is positioned so that the tray 180a acts as a lever while being inserted in the socket 140a, and the protrusion 152a is a fulcrum of the lever (tray 180a), to forcibly insert the pivot pin 162a into the socket 140a by applying a force on the tray.

In this case, the fulcrum is the protrusion 152a–152h. The load is the pivot pin 162a–162h, which is being forced into the sleeve 144a–144h. The force may be applied on any part of the tray 180a–180h. For the greatest leverage and easiest insertion, the force is applied to the distal end of the tray 180a–180h, farthest from the pivot pin 162a–162h. The moment arm (normal distance) between the protrusion and the pivot pin in the socket is substantially less than a moment arm between the protrusion and a portion of the tray on which the force is applied. As shown in FIG. 5, even if the force is applied at the near end of the tray 180a–180h, the moment arm between the protrusion and the pivot pin is substantially less than the moment arm between the protrusion and the distal end of the hinge portion, where the hinge portion is connected to the tray. Thus, even if the force is applied at the proximal end of the tray, substantial leverage is obtained.

FIG. 5 shows hinge portions 160a–160d in various stages during the insertion process. Hinge portion 160a is being introduced into the entrance 142a of socket 140a. The tray 180a and hinge portion 160a are held at a steep angle so the pivot pin 162a can enter the socket entrance 142a, and the leading edge of hinge portion 160a slides under protrusion 152a.

Hinge portion 160b has been inserted until the pivot pin 162a reaches the constriction between the entrance 142a and sleeve 144a. The rounded edge 154b of protrusion 152b facilitates insertion and prevents hinge portion 160b from being nicked. A beveled edge 170b of the hinge portion 160b provides a clearance for the boss 156b of the detent mechanism. At this point, the clockwise rotation of hinge portion 160b begins.

Hinge portion 160c is partially rotated. Force is applied on the tray 180c. The stop 152c acts as a fulcrum and the force is magnified and applied to the pivot pin 162c over a small moment arm. The pivot pin 162c applies a force on the constriction between entrance 142c and sleeve 144c, causing the hook-shaped socket 140c to open.

Hinge portion 160d is completely rotated. The pivot pin 160d is completely captured within sleeve 144d. The protrusions 152d and 152e apply a coupled moment to prevent further clockwise rotation of the tray 180d. Pivot pin 162d is now held snugly within the sleeve 144d of socket 140d. Once the tray is completely inserted in this fashion, the tray can be rotated between the horizontal and vertical positions.

A method for inserting an optical fiber tray 180a into the tray carrier 131 includes inserting a pivot pin 162a of the optical fiber tray 180a into an entrance 142a of a socket 140a in the tray carrier. A force is applied on the optical fiber tray 180a, using the tray as a lever and a first (upper) protrusion 152a on the tray carrier 131 as a fulcrum of the lever. The optical fiber tray 180a is rotated till the pivot pin 162 moves from the entrance 142a to a sleeve portion 144a of the socket 140a. The rotating is stopped when a hinge portion 160a that includes the pivot pin 162a contacts a second (lower) protrusion 152b on the tray carrier 131. A detent 156b is also engaged when the hinge portion 160a contacts the second protrusion 152b on the tray carrier 131.

Once the pivot pin 162a is in the sleeve 144a, the user can rotate the tray 180a in a counter-clockwise direction (opposite the clockwise direction of rotation during insertion.) The counter-clockwise rotation is stopped when a hinge portion 160a that includes the pivot pin 162a contacts the first protrusion 152a. A detent 156a is also engaged when the hinge portion 160a contacts the first protrusion 152a.

A method for providing access to one of the optical fiber trays 180a–180h includes providing a tray carrier 131 having a plurality of fiber optic trays 180a–180h pivotally attached thereto, the trays 180a–180h being stackable on top of each other and parallel to each other. A first one of the trays 180b–180h that is to be accessed is selected. A second one of the trays 180a–180g that is adjacent to and above the selected fiber optic tray 180b–180h is rotated to a (vertical in FIG. 2) detent position. The second tray remains in the detent position without attaching any additional retaining device to the second tray. If there is more than one tray 180a–180g above the selected tray, then all of the fiber optic trays that are above the selected tray are rotated until each rotated tray is in the detent (vertical) position.

When work on the selected fiber tray is completed, the trays above the selected tray are rotated back to a second (horizontal in FIG. 2) detent position. The second detent position is the position in which the trays 180a–180h are stackable on top of each other and parallel to each other. The base plate 110, to which the tray carrier 131 is attached, is then mounted on the fiber optic enclosure (cover) 120, so that the plurality of trays 180a–180h are stacked in parallel inside the fiber optic enclosure 100.

Figure 10:
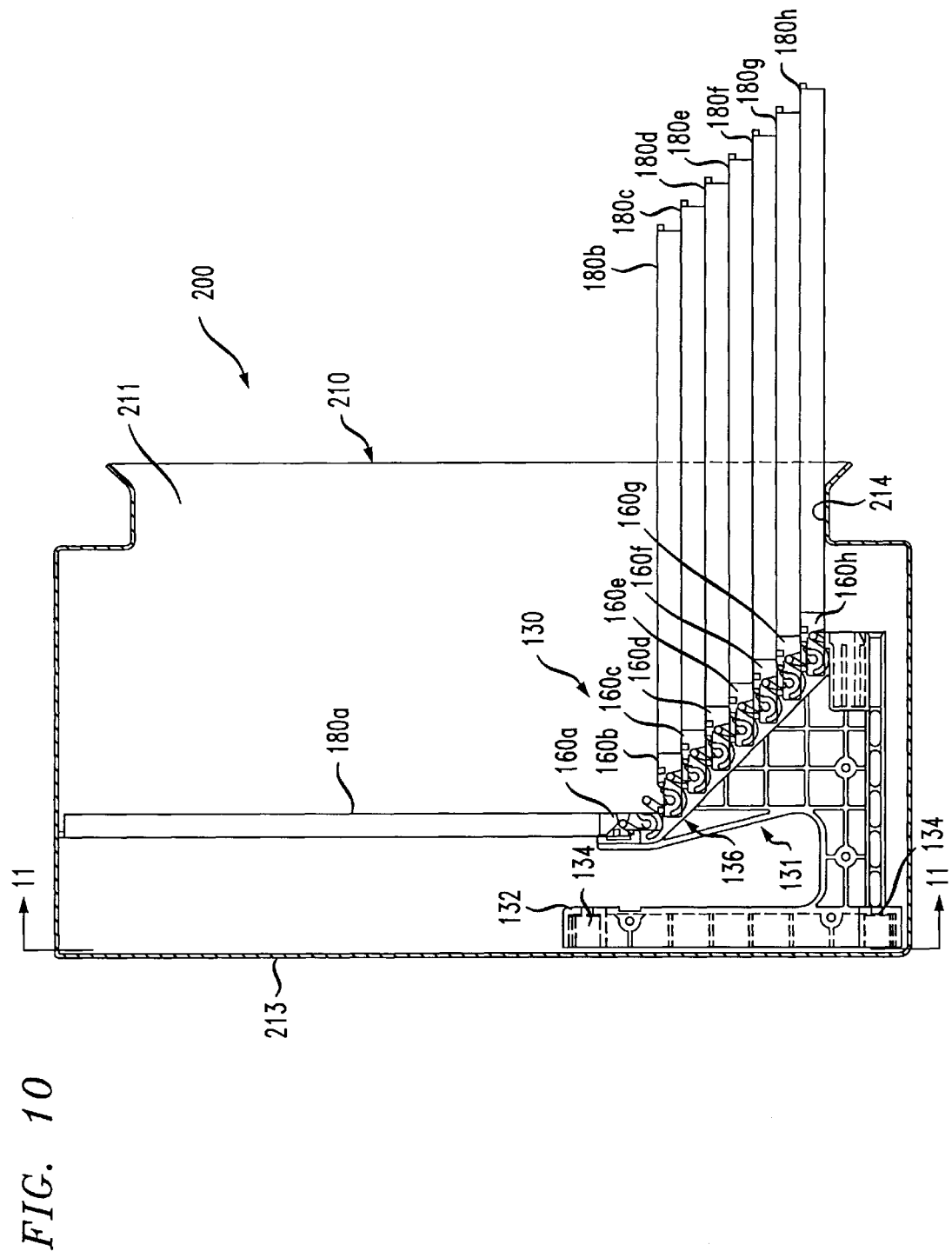
FIG. 10 is a side cross-sectional view showing an interior of a second exemplary fiber enclosure according to the present invention.
Figure 11:
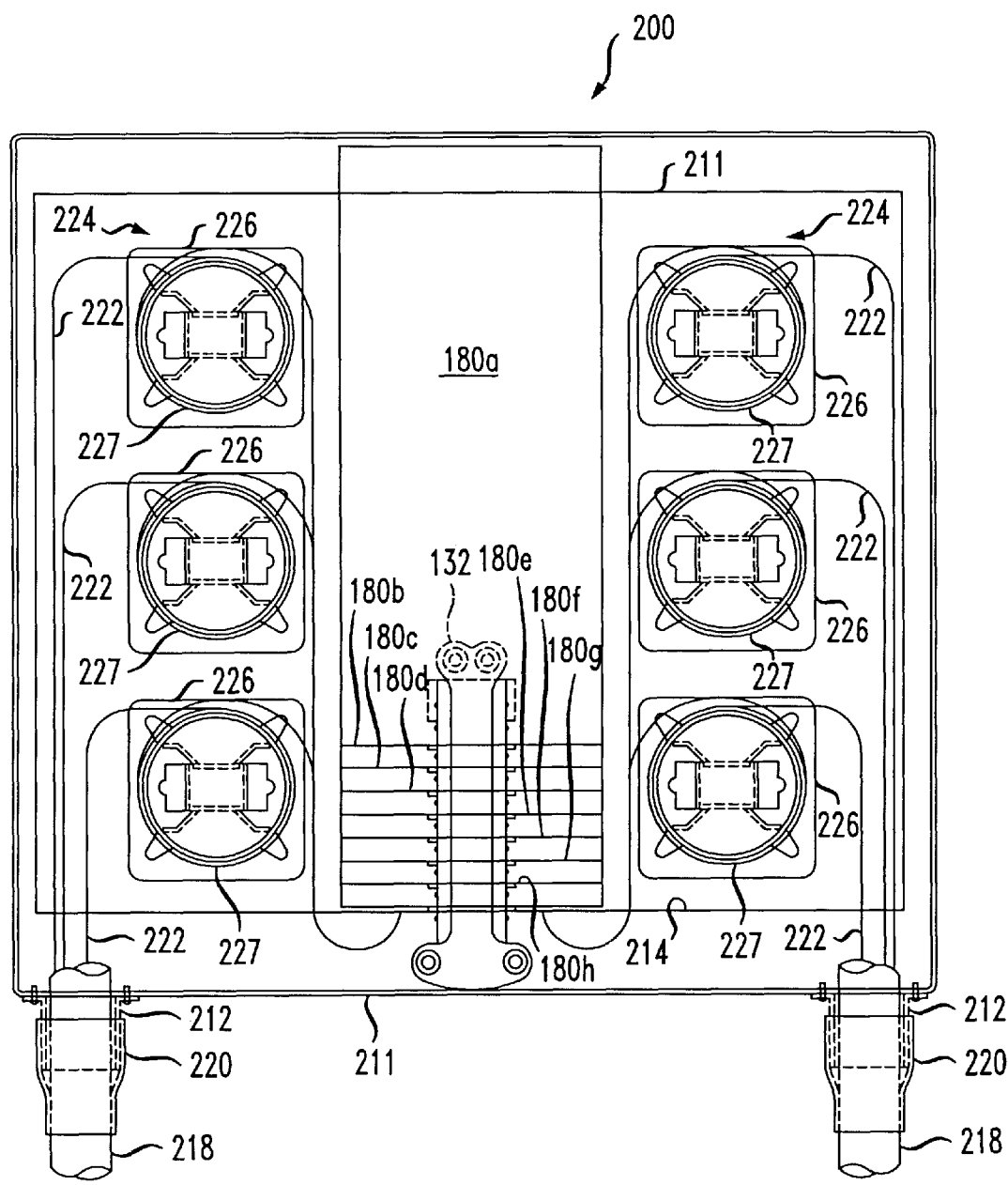
FIG. 11 is a rear cross-sectional view of the enclosure of FIG. 10, taken along section line 11—11 of FIG. 10.

FIGS. 10 and 11 show a second exemplary fiber enclosure according to the invention. FIG. 10 shows an improved fiber enclosure assembly 200 suitable for mounting on a wall within a building. The assembly 200 is designed for environments in which the assembly 200 is not required to be water-tight or air-tight. Thus, instead of an o-ring type seal, enclosure 200 may simply have a door (not shown) with a gasket (not shown), to keep dust from entering. Assembly 200 has a box-shaped enclosure 210, with substantially rectangular sides.

A tray carrier 131 is contained within the enclosure. The tray carrier 131 has a bracket 132 capable of attachment to a back wall 213 of the enclosure 210 or directly mountable to a wall. The tray carrier 131 has at least a first (bottom) tray 180h pivotally mounted on the tray carrier. The first tray 180h has a first position (vertical in FIGS. 10 and 11) on the tray carrier 131 that is suitable for storing the first tray 180h within the enclosure 200. The enclosure 200 has a ledge 214 on a second side opposite the first (wall) side. The first tray 180h is rotatable to a second position (horizontal in FIGS. 10 and 11) in which a bottom surface of the first tray 180h rests on the ledge 214 of the enclosure 200. The ledge 214 acts as a worktable to support the tray 180h. Each of the trays 180a–180g other that the bottom tray 180h has a respective stop to prevent the trays from rotating past the second position.

Preferably, the assembly 200 includes a plurality of optical fiber trays 180a–180h, each tray being pivotally mounted on the tray carrier 131. Each tray 180a–180h is rotatable to a first (vertical) position that is suitable for storage in the enclosure with the trays parallel to and stacked upon each other. Each tray is rotatable to a second vertical position.

The exemplary enclosure 200 preferably includes the same fiber tray carrier 131 described above with reference to FIGS. 2–9. Alternatively, other types of fiber tray carriers may be used inside enclosure 200.

The first tray 180h may be an optical fiber splice tray or the like. The enclosure 200 includes at least one, preferably two open spaces 224 beside the splice tray 180h. The open space 224 is capable of storing slack fiber 227 on appropriate spools 226. The exemplary enclosure 200 has spools 226 on both sides of the trays 180a–180h for storing slack fiber 227.

The exemplary enclosure has at least one (preferably two or more) cable ports 212 on a bottom surface thereof. The cable ports 212 are attached to a base plate (end cap) 211, which may be formed as a separate piece, or may be integral with the remainder of enclosure 210. Each cable port 212 is adjacent to a respective one of the two open spaces 224 in which the slack fiber 227 is stored. Note that in FIGS. 10 and 11, the cable ports 212 are on the bottom of the enclosure 200, but the mounting bracket 132 of the tray carrier 131 is mounted on the rear side of the enclosure 200. This differs from the embodiment of FIGS. 2–9, in which the cable ports 112 and mounting bracket 132 are on the same base plate 110.

In the embodiment of FIGS. 10 and 11, the trays are parallel to the rear (wall) side of the enclosure when the trays are in the first (storage) position. One or more successive ones of the plurality of trays 180a–180g can be rotated to the second (horizontal in FIG. 10) position simultaneously, so as to be parallel to and stacked upon the bottom tray 180h, while the bottom tray is in the second position, resting on the ledge 214.

Preferably, in the tray carrier 131 of the wall mounted closure 210, each of the plurality of trays 180a–180h has a respective detent 156a–156h to maintain the trays in the first (vertical) position for storage, and a respective detent 156b–156i to maintain the trays in the second (horizontal) position. In the exemplary embodiment the detents include bosses 156a–156h above each socket 140a–140h, as described above. Preferably, the tray carrier includes stops 152a–152h to prevent the trays 180a–180h from rotating past the first position.

An exemplary method of enclosing optical fiber splices according to the embodiment of FIGS. 10 and 11 includes mounting a fiber enclosure 210 on a wall; and pivotally mounting a plurality of optical fiber splice trays 180a–180h in the enclosure 210, so that each tray is rotatable to a first (vertical) position that is suitable for storage in the enclosure with the trays parallel to and stacked upon each other. A further step may include resting a bottom surface of the bottom tray 180h on a ledge 214 of the enclosure 210 while the bottom tray is in the second position. Another step may include rotating at least a bottom one 180h of the trays 180a–180h to a second (horizontal) position, so as to expose the top side of a top one of the rotated trays when at least one of the trays is in the second position. For example, trays 180e–180h may be rotated to the horizontal position, so as to expose the top side of tray 180e. A further step may include storing slack optical fiber 227 in the enclosure 210 on one or both sides of the plurality of splice trays 180a–180h.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. An optical fiber organizer comprising:
    at least one optical fiber tray having a top side for holding a fiber, the tray having a hinge portion;
    a tray carrier having at least one socket, the socket capable of receiving the hinge portion of the tray, the tray having a first position on the tray carrier that is suitable for storing the tray within an optical fiber enclosure, the tray carrier having a second-position detent for maintaining the tray in a second position, the first and second positions differing from each other, wherein
    the tray carrier has a first-position detent including a first boss below the socket, and the second-position detent includes a second boss above the socket, and
    the hinge portion of the tray has a hole capable of receiving either the first boss or the second boss.

2. The optical fiber organizer of claim 1, wherein the first and second positions differ from each other in angle by about 90 degrees.

3. The optical fiber organizer of claim 1, wherein the hinge portion of the tray has a pair of ramps adjacent the hole, for guiding either the first or second boss of the tray carrier to the hole.

4. The optical fiber organizer of claim 1, wherein the tray carrier has a member on which the second boss is located, and the socket includes a hook depending from the member.

5. The optical fiber organizer of claim 4, wherein the tray carrier has a bracket to which the member is attached, the member being approximately perpendicular to the bracket.

6. The optical fiber organizer of claim 1, wherein the tray carrier includes: a first stop for preventing the tray from rotating beyond the first position, and a second stop for preventing the tray from rotating beyond the second position.

7. The optical fiber organizer of claim 1, wherein:
    the optical fiber organizer includes a plurality of optical fiber trays, each tray having a top side for holding a fiber, each tray having a hinge portion;
    the tray carrier has a plurality of sockets, each socket capable of receiving the hinge portion of a respective tray, each tray having a first position on the tray carrier, the trays being stacked parallel to each other when the trays are in the first position, each socket having associated therewith a first-position detent for maintaining its respective tray in the first position, each socket having associated therewith a second-position detent for maintaining its respective tray in a second position, the top side of one of the trays being exposed when at least one of the trays is in the second position.

8. The optical fiber organizer of claim 7, wherein a single boss acts as the first-position detent associated with a first one of the sockets and the second-position detent associated with a second one of the sockets, the second socket being adjacent the first socket.

9. The optical fiber organizer of claim 7, wherein
    the first-position detent associated with each socket includes a first boss below the socket, and the second-position detent associated with each socket includes a second boss above the socket, and
    the hinge portion of each tray has a hole capable of receiving either the first boss or the second boss, and the sockets and bosses alternate with each other on the tray carrier.

10. The optical fiber organizer of claim 7, wherein:

the tray carrier includes, for each socket, a first stop for preventing the tray received by that socket from rotating beyond the first position, and a second stop for preventing the tray received by that socket from rotating beyond the second position; and a single protrusion acts as the first stop associated with a first one of the sockets and the second stop associated with a second one of the sockets, the second socket being adjacent the first socket.

11. The optical fiber organizer of claim 7, wherein:

each socket is hook-shaped and has a substantially vertical surface at an end thereof, and the vertical surface of a first one of the sockets acts as a stop to limit rotation of the one of the trays that has the pivot pin thereof inserted in a second one of the sockets adjacent to the first socket.

12. The optical fiber organizer of claim 7, wherein the tray carrier includes a bracket that includes the plurality of sockets, the bracket being diagonal to a plane in which the trays lie when the trays are in the first position.

13. The optical fiber organizer of claim 12, wherein the diagonal bracket has a plurality of perpendicular members projecting therefrom, each perpendicular member having a boss at an end thereof, each diagonal member having one of the plurality of sockets depending therefrom, the boss forming the second detent associated with that socket.

14. The optical fiber organizer of claim 13, wherein:

each perpendicular member has a protrusion thereon, the protrusion preventing rotation beyond the second position by the tray in the socket depending from that perpendicular member.

15. The optical fiber organizer of claim 12, wherein the diagonal bracket is attached to a base plate of a fiber optic enclosure.

16. An assembly comprising:

a fiber enclosure;

a base plate attached or capable of attachment to the fiber optic enclosure;

a plurality of optical fiber trays, each tray having a top side for holding a fiber, each tray having a hinge portion;

a tray carrier attached to the base plate, the tray carrier having a plurality of sockets, each socket capable of receiving the hinge portion of a respective tray, each tray having a first position on the tray carrier, the trays being stacked parallel to each other when the trays are in the first position for insertion of the base plate onto the fiber enclosure, each socket having associated therewith a first detent for maintaining its respective tray in the first position, each socket having associated therewith a second detent for maintaining its respective tray in a second position, the top side of one of the trays being exposed when at least one of the trays is in the second position, wherein each first detent includes a first boss below its respective socket, and each second detent includes a second boss above its respective socket, and the hinge portion of each tray has a hole capable of receiving either the respective first boss or the respective second boss.

17. A method for providing access to an optical fiber tray, comprising the steps of:

providing a tray carrier having a plurality of fiber optic trays pivotally attached thereto, the trays being stackable on top of each other and parallel to each other;

selecting a first one of the trays that is to be accessed;

rotating a second one of the trays that is adjacent to and above the first fiber optic tray to a detent position, wherein the second tray remains in the detent position without attaching any additional retaining device to the second tray, wherein the tray carrier has a first-position detent including a first boss below the socket, and the second-position detent includes a second boss above the socket, and the hinge portion of the tray has a hole capable of receiving either the first boss or the second boss.

18. The method of claim 17, further comprising the step of rotating all of the fiber optic trays that are above the first tray until each rotated tray is in the detent position.

19. The method of claim 17, further comprising rotating the second tray back to a second detent position, the second detent position being the position in which the trays are stackable on top of each other and parallel to each other.

20. The method of claim 19, further comprising the step of mounting a base plate, to which the tray carrier is attached, on a fiber optic enclosure, so that the plurality of trays are stacked in parallel inside the fiber optic enclosure.

21. The method of claim 17, wherein the hinge portion of the tray has a pair of ramps adjacent the hole, further comprising the step of guiding either the first or second boss of the tray carrier to the hole using the ramps.

22. The optical fiber organizer of claim 4, wherein the hinge portion of the tray rotates about an axis, and the second boss is on a terminal portion of the member, facing in a direction of the axis.

* * * * *